(12) United States Patent
Pei et al.

(10) Patent No.: US 7,373,653 B2
(45) Date of Patent: May 13, 2008

(54) CHANNEL MERGING METHOD FOR VOD SYSTEM

(75) Inventors: Yun Zhang Pei, Beijing (CN); Ling Shao, Beijing (CN) Xie; Dong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 10/726,835

(22) Filed: Dec. 3, 2003

(65) Prior Publication Data

US 2004/0172654 A1  Sep. 2, 2004

(30) Foreign Application Priority Data

Dec. 5, 2002  (CN)  .................. 02 1 54006

(51) Int. Cl.
  *H04N 7/173* (2006.01)
(52) U.S. Cl. .............. 725/95; 725/94; 725/90; 725/91; 725/93; 725/97; 725/103; 725/114; 725/116; 725/138; 725/144; 725/146; 709/238; 709/239; 709/240; 709/241; 709/242; 709/243; 709/244
(58) Field of Classification Search .............. 725/90, 725/91, 93, 94–97, 103, 114, 116, 138, 144, 725/146; 709/238–244
See application file for complete search history.

(56) References Cited

U.S. PATENT DOCUMENTS

| | | | |
|---|---|---|---|
| 6,198,478 B1 * | 3/2001 | Ota et al. .................. 715/716 |
| 6,377,972 B1 * | 4/2002 | Guo et al. ................... 709/201 |
| 6,665,732 B1 * | 12/2003 | Garofalakis et al. ........ 709/247 |
| 6,859,839 B1 * | 2/2005 | Zahorjan et al. ............ 709/231 |
| 6,938,268 B1 * | 8/2005 | Hodge ......................... 725/93 |
| 7,111,316 B1 * | 9/2006 | Zahorjan et al. .............. 725/97 |
| 2002/0023166 A1 * | 2/2002 | Bar-Noy et al. ............ 709/231 |
| 2002/0114330 A1 * | 8/2002 | Cheung et al. ............. 370/390 |
| 2003/0056217 A1 * | 3/2003 | Brooks ........................ 725/46 |

OTHER PUBLICATIONS

Liao et al. "The Split and Merge (SAM) Protocol for Interactive Video-On-Demand Systems," Infocom 1997, Apr. 7, 1997, pp. 1349-1356, XP010251958.
Bommaiah et al., "Design and Implementation of a Caching System for Streaming Media Over the Internet," May 31, 2000, pp. 111-121, XP002283106.
Shi et al. "A Novel Stream Merging Algorithm for VOD Servers," Dec. 15, 2003, pp. 1982-1986, XP002283130.

(Continued)

Primary Examiner—Jason Salce
(74) Attorney, Agent, or Firm—Louis P. Herzberg

(57) ABSTRACT

A channel merging method for a VOD system, said method comprises the steps of: in response to requests from a plurality of clients for a video program, establishing a root channel (S1) and at least one sub-channel (S11), said root channel (S1) being established according to a request from a client that makes the earliest request, each of said sub-channels (S11) being established in response to a request from a client that makes a later request; and monitoring variation of the number of the clients that are using each of said established channels, and maintaining the channel if the number of the clients using the monitored channel is not zero, and closing the channel if the number of the clients using the monitored channel becomes zero.

12 Claims, 8 Drawing Sheets

OTHER PUBLICATIONS

Hua et al., "Skyscraper Broadcasting: A New Broadcasting Scheme for Metropolitan Video-On-Demand Systems," New York, vol. 27, No. 4, 1997, pp. 89-100, XP00886096.

Eager et al. "Minimizing Bandwith Requirements for On-Demand Data Delivery," vol. 13, No. 5, Sep. 2001, pp. 742-757, XP002283131.

Eager et al. "Optimal and Efficient Merging Schedules for Video-On-Demand Servers," vol. 1, 1999, pp. 199-202, XP002283132, Orlando, Florida.

Coffman et . "The Dydadic Stream Merging Algorithm," vo. 43, No. 1, Apr. 2002, pp. 120-137, XP002283133, Diluth, MN.

Wanjuim Liao et al: "The split and merge (SAM) protocol for interactive video-on-demand sytems" INFOCOM '97 Sixteenth Annual Joint.

Conference of the IEEE Computer and Communications Societies. Driving the Information Revolution.,Proceedings.

IEEE Kobe, Japan Apr. 7-11, 1997, Los Alamitos, CA USA,IEEE Comput. Soc, US, Apr. 7, 1997, pp. 1349-1356, XP010251958 ISBN: 0-8186-7780-5.

Bommaiah, E, Guo K.; Hofmann, M.; Paul, S.;"Design and Implementation of a Caching System for Streaming Media over the Internet".

Real-Time Technology and Applications Symposium,2000, RTAS 2000. Proceedings., [Online] May 31, 2000, pp. 111-121.

XP002283106 Retrieved from the Internet URL: http://ieeexplore.ieee.org/ie15/6875/185/18516/00852456.pdf?isNumber=18516&prod=CNF&amumber=852456&arSt=111&ared=121&arAuthor.=Bommaiah% 2C+E.%3B+Guo%2C+K.%3B+Hofmann%2C+M.%3B+Paul%2C+S.>[retrieved on May 21, 2004].

* cited by examiner

CHANNEL MERGING METHOD FOR VOD SYSTEM

FIELD OF INVENTION

The present invention relates to a channel merging method, and more particularly to an optimized multicast delivery to a plurality of clients by using the merging of a plurality of channels delivering a video stream in a communication network.

BACKGROUND OF THE INVENTION ART

With the explosive growth of the Internet and the increasing power of computers, interest has grown in a class of application called video-on-demand, where clients can request media files (video, audio, data . . . , etc.) at any time for immediate or future watching. However, video-on-demand poses a new challenge, that is, a huge consumption of server bandwidth and network bandwidth. Traditionally, each request is served by a dedicated unicast stream, and the cost of the unicast based VOD system is enormous. The advent of channel merging technology creates a brand new model for VOD service, and its goal is to reduce the server bandwidth required to satisfy clients requesting a particular object video by having them simultaneously receive two or more streams. As clients receive and store the data for immediate watching purposes, the server can have one video object served to more than one user simultaneously by multicast and thus reduce both the network bandwidth and server bandwidth.

Existent channel merging methods can be classified as three types: static broadcast, merge tree construction and event driven. The static broadcast, exampled by Skyscraper, broadcasts segments of a demanded object in several channels with a specified period and length. The advantage of the static broadcast is its simplicity and relatively high efficiency in very busy environment. However, the performance of the static broadcast is poor when the load of system is not high or the popularity of different objects is disperse due to its rigid resource allocation. The merge tree construction, exampled by Dyadic, dynamically constructs a merge tree when the new users arrive, with the nodes of tree representing channels. A channel is not allocated until it is really needed by a user. This method overcomes the drawbacks of the static broadcast by eliminating the waste of idle channel resources. However, as the merge tree is exclusively determined by the joining time of new users, it does not directly support VCR-like functions, i.e., random stop, pause, fast/back forward, etc. The Event-driven, exampled by SRMT (Simple Reachable Merge Target) and CT (Closest Target), dynamically determines a set of channels that the client should subscribe to when the client indicates to the server of playing, stopping, jumping or merging events. VCR-like functions are supported by this method because the merge path for each client is dynamically adjusted according to user interactions.

A method of merging of two channels will be described below in conjunction with FIGS. 1, 2 and 3:

At step 1, the VOD server 1 receives a request for playing a video program from a client A and, according to the request, sends the requested video program to the client A on the channel S6.

At step 2, when receiving the same VOD request as that of the client A after some time (T) from a client B, the VOD server 1 creates a channel S11 and informs the client B to get ready for receiving from the VOD server 1 the video program on the channel S11 and the channel S6.

At step 3, the VOD server 1 sends the video program from its starting point (a) to the client B on the channel S11, and the client B receives it, and meantime the client B receives on the channel S6 in synchronism with the client A and stores the subsequent part of the video program continuously sent from the VOD server 1.

At step 4, the VOD server 1 takes the channel S6 as the parent channel of the channel S11 (i.e., the channel to which the channel S11 will merge). When the video program received by the client B on the channel S11 reaches the beginning point (b) of the video program that it receives on the channel S6 and stores, i.e., when another time of T is passed, the channel S11 is merged into the channel S6. The VOD server 1 will close the channel S11 and stops sending the video program to the client B on the channel S11. At this time, in the client B is stored the video program from the point (b) to a point (c). After the channel S11 (sub-video stream) is merged into its parent channel S6, if no other client is using the sub-channel S11 (i.e., the sub-channel of the channel S11), then the sub-channel S11 will be terminated.

At step 5, after the channel S11 is merged into the channel S6, while the client B continues to receive, on the channel S6, and stores the subsequent part of the video program sent from the VOD server 1 from the point (c), it reads from the point (b) and plays back the video program stored in its local memory in a FIFO manner, enabling the playback of the video program on the client B to be continued.

Although the event-driven method for channel merging are the most flexible method for controlling multicast channels, existing methods of this type have an evident drawback. If a channel is removed when it has merged into its parent channel or is canceled due to stopping or jumping events, those clients subscribing the sub-channels of this removed channel have to change the channels they have subscribed. For example, the CT scheme simply chooses the latest video stream channel in the earlier video streams still in the system as the next target to be merged, and the merge target computed by CT are not always reachable, even if no further new sub-channel is created. The reason is that the target stream channel may itself merge with its target channel before it can be reached by later channels. In this case, later stream channel must select a new merge target again by using the CT algorithm. Furthermore, the operations of the target stream channel such as random stopping, pausing, fast-forwarding, etc. will also make it impossible for the later stream channels to merge and will force them to reselect their new parent channels.

In order to inform affected clients of the change of merge tree, the video server must actively send a notification to the each of these clients. This could bring about the following disadvantageous effects:

1. Reverse notifications from a video server to clients significantly may increase the load of the video server, since the number of notifications is proportional to the number of affected clients and the frequency of unexpected channel stopping events.
 2. Clients must be ready to accept incoming connections from unknown regions of the Internet, which increases the possibility for clients to be affected unexpectedly.
 3. The reverse notifications may not be able to pass through the firewall with certain configurations. For example, if a client within a firewall tries to watch a video clip stored in a video server outside the firewall, the server will never be able to initiate the transmission of a notification to the client.

SUMMARY OF THE INVENTION

In order to solve the above-mentioned problems, by using a criterion for deciding a merge path in response to events of starting, jumping, merging, and stopping, the present invention provides channel merging methods, apparatus and systems for a VOD system. An example method comprises the steps of: (1) in response to requests from a plurality of clients for a video program, establishing a root channel (S1) and at least one sub-channel (S11), said root channel (S1) being established according to a request from a client that makes the earliest request, each of said sub-channels (S11) being established corresponding to a request of a client that makes a later request; (2) monitoring variation of the number of the clients that are using each of said established channels, and maintaining the channel if the number of the clients using the monitored channel is not zero, and closing the channel if the number of the clients using the monitored channel becomes zero.

The present invention also provides a channel merging apparatus for a VOD system, said channel merging apparatus is disposed in a video server in said VOD system or connected to the same operatively, said channel merging apparatus comprises: a channel selecting unit for establishing a root channel (S1) and at least one sub-channel (S11) in response to requests from a plurality of clients for a video program, said root channel (S1) being established according to a request from a client that makes the earliest request, each of said sub-channels (S11) being established in response to a request from a client that makes a later request; a channel control unit for monitoring variation of the number of the clients that are using each of said established channels, and maintaining the channel if the number of the clients using the monitored channel is not zero, and closing the channel if the number of the clients using the monitored channel becomes zero.

In the present invention, all the "channel merging events" proceed in the direction from the lowest-level sub-channel to the root channel, therefore no case that the channel which a client is using is removed will occur. Even if a stopping event occurs directly, a channel will not be removed until all clients that use it (in the form of a sub-channel of the channel) explicitly release it. Therefore reverse notifications are avoided, and one client's behavior will not affect other clients, and the load of both the VOD server and the network are reduced.

BRIEF DESCRIPTION OF THE DRAWINGS

The above-mentioned advantages and other features of the present invention will become more apparent from the following detailed description in conjunction with the drawings, in which.

DESCRIPTION OF THE INVENTION

Figure 1:
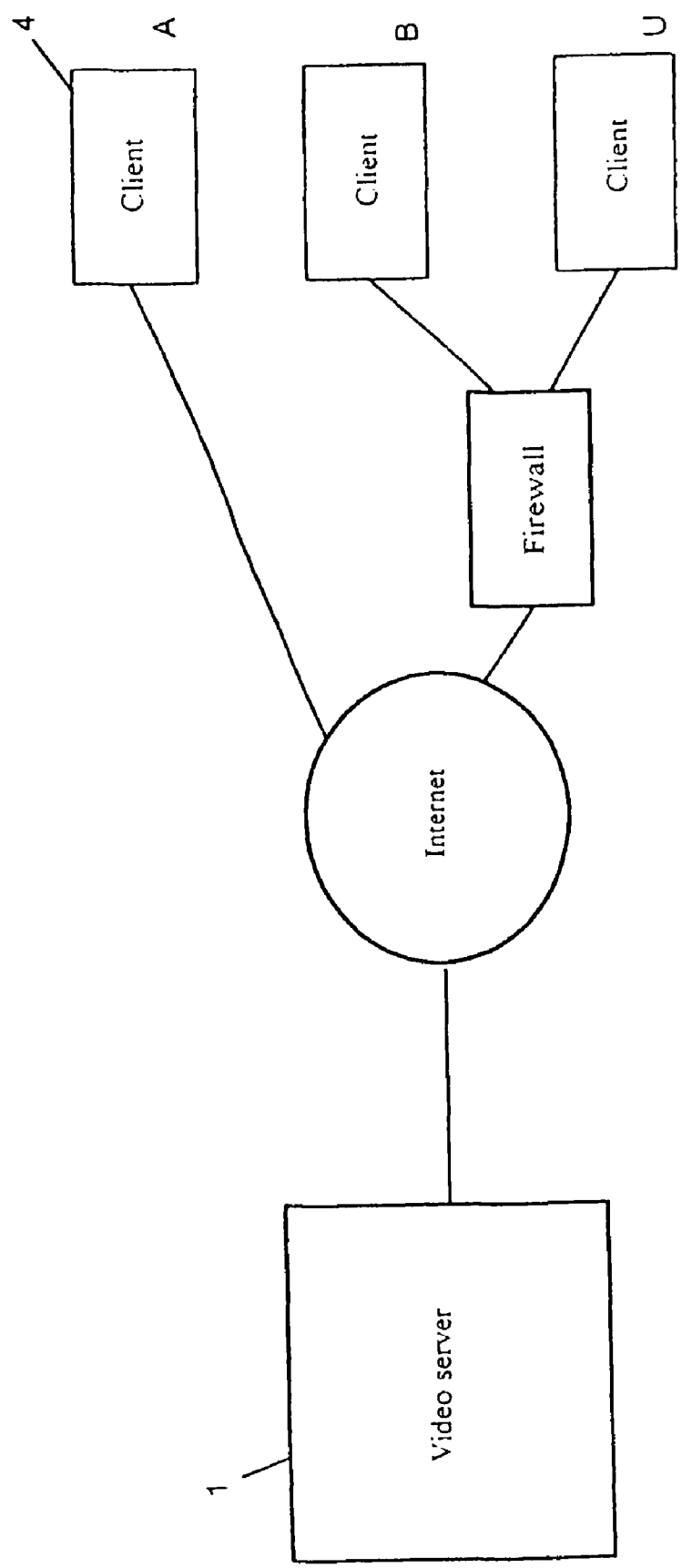
FIG. 1 shows a multicast network having a VOD server and a plurality of clients.

The present invention provides methods, systems and apparatus to solve the above-mentioned problems, by using a criterion for deciding a merge path in response to events of starting, jumping, merging, and stopping. In an example embodiment, the present invention provides a channel merging method for a VOD system. The method comprises the steps of: (1) in response to requests from a plurality of clients for a video program, establishing a root channel (S1) and at least one sub-channel (S11), said root channel (S1) being established according to a request from a client that makes the earliest request, each of said sub-channels (S11) being established corresponding to a request of a client that makes a later request; (2) monitoring variation of the number of the clients that are using each of said established channels, and maintaining the channel if the number of the clients using the monitored channel is not zero, and closing the channel if the number of the clients using the monitored channel becomes zero.

Also provided is a channel merging apparatus for a VOD system. The channel merging apparatus is disposed in a video server in said VOD system or connected to the same operatively. In an example embodiment, the channel merging apparatus comprises: a channel selecting unit for establishing a root channel (S1) and at least one sub-channel (S11) in response to requests from a plurality of clients for a video program, said root channel (S1) being established according to a request from a client that makes the earliest request, each of said sub-channels (S11) being established in response to a request from a client that makes a later request; a channel control unit for monitoring variation of the number of the clients that are using each of said established channels, and maintaining the channel if the number of the clients using the monitored channel is not zero, and closing the channel if the number of the clients using the monitored channel becomes zero.

In the present invention, all the "channel merging events" proceed in the direction from the lowest-level sub-channel to the root channel, therefore no case that the channel which a client is using is removed will occur. Even if a stopping event occurs directly, a channel will not be removed until all clients that use it (in the form of a sub-channel of the channel) explicitly release it. Therefore reverse notifications are avoided, and one client's behavior will not affect other clients, and the load of both the VOD server and the network are reduced. Meantime, VCR-like functions, e.g., playing, stopping, seeking (fast/back forward), etc. are inherently supported by this method because the merge tree is dynamically constructed and adjusted when client-initiated events occur, and the merge path for each client is dynamically adjusted based on the merge tree.

Another main advantage of the invention is that the method for controlling the VOD server is compatible with the request/response mode of HTTP, thus can be easily implemented upon HTTP. HTTP is an important protocol for exchanging application data on the Internet, and the advent of Web services further consolidates the trend that Internet-based applications should rely on HTTP as much as possible for data transmission. In addition, most firewalls are reluctant to let general traffic other than HTTP pass through.

The present invention will be described in detail hereinafter in conjunction with the drawings. Unless noted specially, all such operations as starting, stopping, jumping, merging and etc. mentioned in the following is performed with respect to channels on which the same video program (object) are played.

FIG. 1 shows a multicast network having a sever 1 and a plurality of clients 4. The multicast network comprises a VOD server 1, the Internet 2, a firewall 3 and a plurality of clients 4, wherein the VOD server 1 and the clients 4 communicate with each other through the Internet 2 and the firewall 3. In the present invention, the client 4 sends requests to the VOD server 1 through the firewall 3 and the Internet 2, for performing the operations of VCR-like functions such as playing, stopping, pausing, fast/back forwarding on a video clip.

The request/response operation occurring between the VOD server 1 and the clients 4 of FIG. 1 will be described below in conjunction with FIG. 4.

Figure 4:
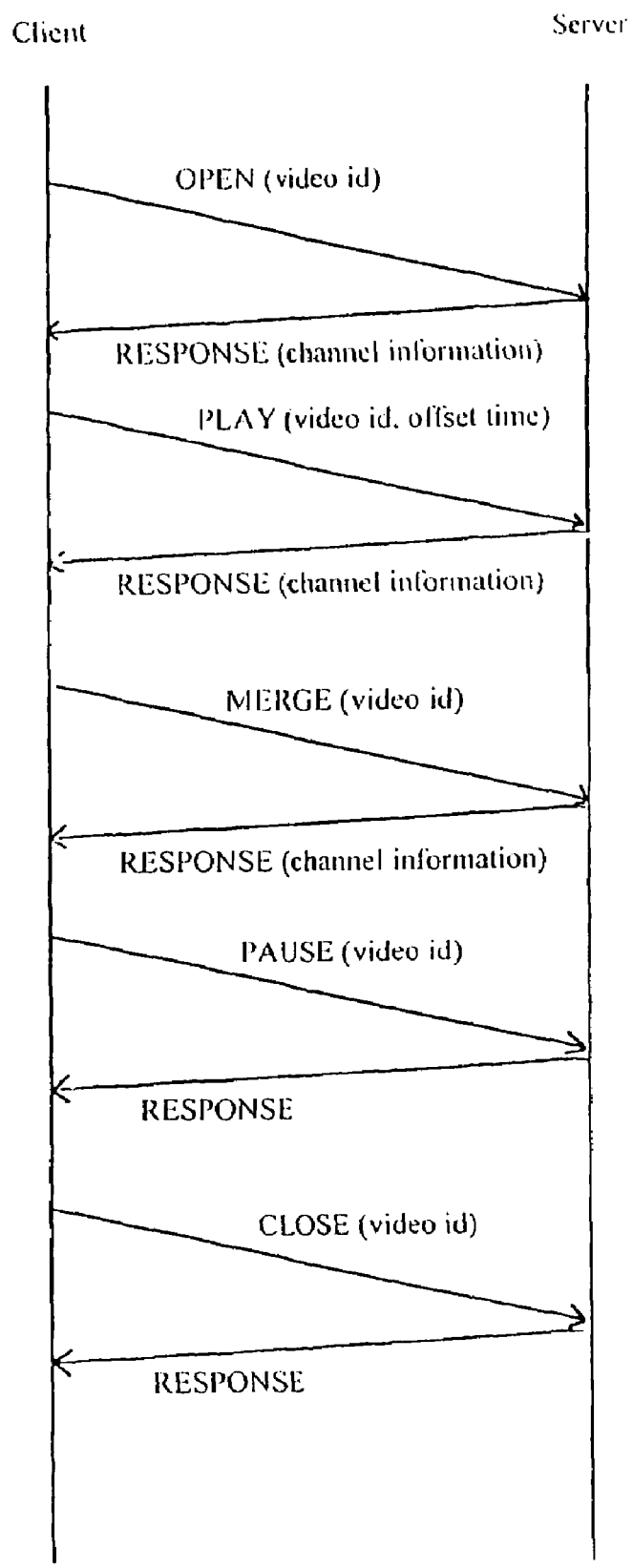
FIG. 4 is a timing diagram of request/response occurring between the VOD server and the client of FIG. 1.

FIG. 4 is a timing diagram of the request/response occurring between the VOD server 1 and the clients 4 of FIG. 1.

In FIG. 4, each message contains the message type of the action to be performed, which is specified by a list of parameters. Here are currently five message types defined: OPEN, PLAY, PAUSE, MERGE and CLOSE. For each message sent by the client, the sever will send back a RESPONSE message.

At step (1), by sending an OPEN message to the VOD server 1, the client 4 creates a session with the VOD server 1, the OPEN message containing a video ID for uniquely identifying the requested video file (video program) on the VOD server 1. If the session is successfully created, then the VOD server 1 will send back to the client 4 a RESPONSE message containing channel information, such as multicast address and port number, and the client 4 can receive the requested video program according to the channel information.

At step (2), the client 4 sends a PLAY message to request to start playing the video program or resume from paused state. An offset can be specified as a parameter in the PLAY message to search a specified position of the video program. The RESPONSE message may contain additional information for the client 4, such as the information that indicates the client 4 to receive the requested program, and etc.

At step (3), when the client 4 detects the merging of channels, it sends a MERGE message to the VOD server 1 (of course, the VOD server 1 can also derive the occurrence of a channel merging event by using its components such as the channel control unit 20 to compute the channel). The VOD server 1 will close channels that are not used and send back a RESPONSE message indicating additional channels to which the client 4 should join.

At step (4), the client 4 can send a PAUSE message to the VOD server 1 to temporarily halt data transmission while playing the video program, and the VOD server 1 makes a corresponding response.

At step (5), the client 4 can send a CLOSE message to the VOD server 1 to explicitly close the session with the VOD server 1, and the VOD server 1 makes a corresponding response.

If we model all the above-mentioned requests and notification messages into various events, then there are four types of event pertinent to the VOD server 1, i.e., "starting event", "jumping event", "stopping event" and "merging event". All these events can be operated through the above-mentioned five types of messages, i.e., OPEN, PLAY, PAUSE, MERGE and CLOSE.

Figure 2:
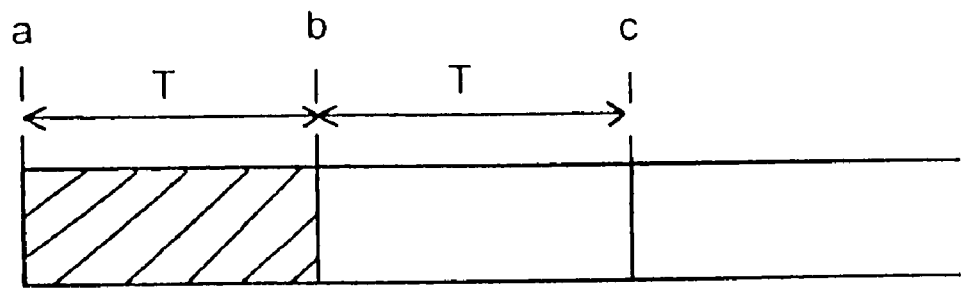
FIG. 2 is a schematic diagram of a video program stream that performs channel merging.

When the client 4 sends a request for an object (video program), a starting event happens, i.e., the client 4 requests to play a video clip at time "t" (using a PLAY message). A jumping event happens when the client 4 sends a fast-forward or back-forward request for an object. That is, the client 4 sends a request for playing the video program from time "t+s" or "t−s", where "s" is an offset time of an object (i.e., other parts of the requested video program) to be jumped with respect to time "t". At this time, the VOD server 1 creates a new channel to play the video program from time t−s (using the PLAY message), and meantime closes the channel that plays the video program from time "t" (using the CLOSE message, as will be described in detail below). A stopping event happens when the client 4 no longer needs an object, i.e., the channel on which the video program is played is closed (using a CLOSE message). A merging event happens when the client 4 has reached a merge point where the last channel pair the client 4 was watching have successfully merged (using the MERGE message and the CLOSE message), such as the case of the channel merging method described in the portion of the background art of the present invention, i.e., the beginning point (b) in FIG. 2 is the merged point.

In order to implement the operations of VCR-like functions such as playing, stopping, pausing, fast forward/backward, the present invention provides a channel merging apparatus 40.

The specific structure of the channel merging apparatus 40 according to the present invention will be described now in conjunction with FIG. 5.

Figure 5:
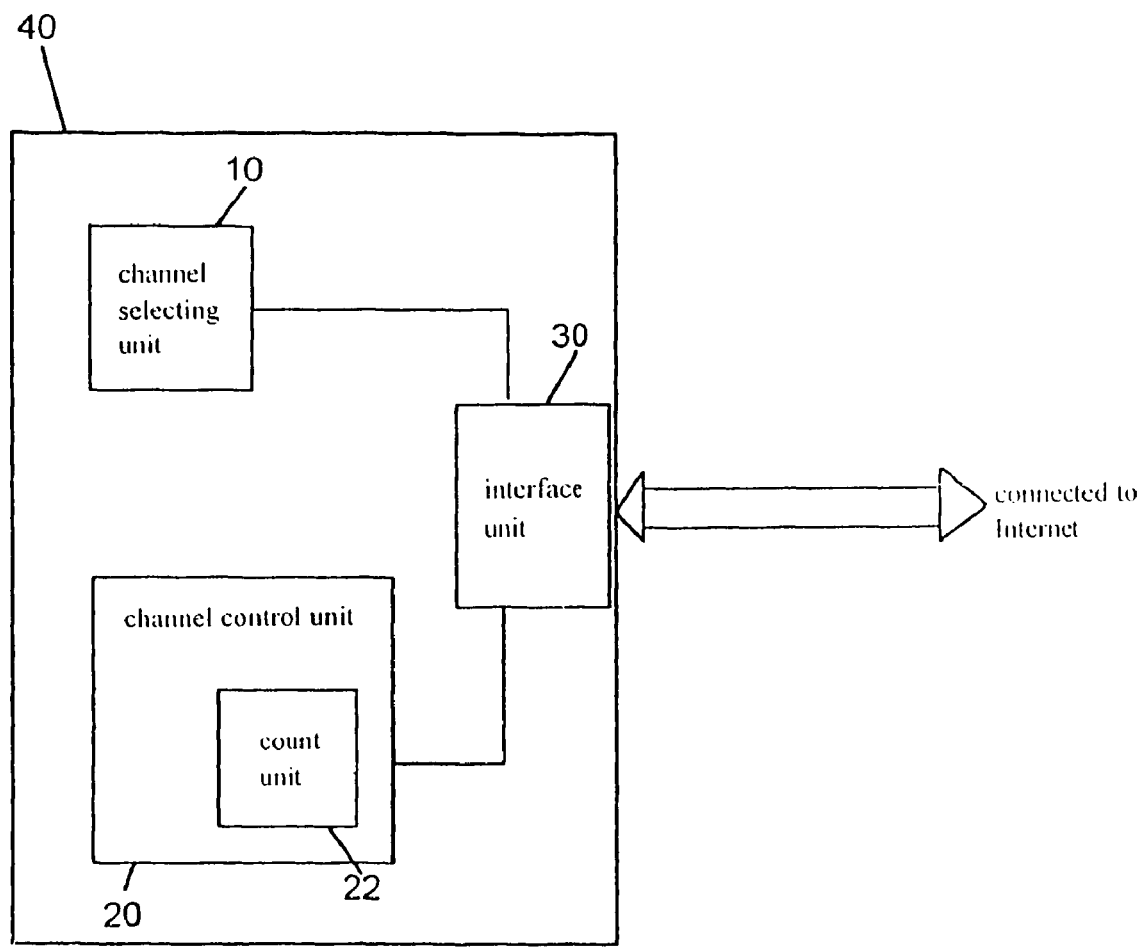
FIG. 5 is a diagram showing the structure of a channel merging apparatus configured in the VOD server according to the present invention.

FIG. 5 is a view showing the structure of the channel merging apparatus 40 according to the present invention.

The channel merging apparatus 40 according to the invention is disposed inside the VOD server 1, comprises: a channel selecting unit 10 for receiving requests for a certain video program from a plurality of clients, and for creating a root channel (S1) and at least one sub-channel (S11) in response to the requests, said root channel (S1) being created according to a request of a client that makes the earliest request, each of said plurality of sub-channels (S11) being created in response to the request of a client that makes a request later, the channel selecting unit 10 further seeking a parent channel satisfying with conditional expressions (1) and (2) to be described later for a sub-channel in the channel merging process; and a channel control unit 20 for performing such operations as the creating, merging and closing of channels according to the request of the client 4 and the selection result of the channel selecting unit 10.

In addition, the above-mentioned channel merging apparatus 40 can be connected to the VOD server 1 operatively, instead of being disposed inside the VOD server 1. Meantime, the channel selecting unit 10 and the channel control unit 20 can be a single unit, such as a CPU in a computer, for executing an executable program stored in ROM or RAM or other storage medium (not shown) in the computer to effect the functions corresponding to the channel selecting unit 10 and the channel control unit 20.

The channel control unit 20 further comprises a count unit 22, which marks the number of the clients 4 using each channel with a count parameter (ref_num) to effect the control function of the channel control unit 20. When a merging, jumping or stopping event happens to said each channel and its sub-channels, the count unit 22 decreases the value of the count parameter, and if the value of the count parameter is zero, the channel whose value of the count parameter is zero is closed at the side of the VOD server 1.

If the value of the count parameter is not zero, then the channel is maintained at the VOD server 1, and the client having performed the merging, jumping or stopping event no longer receives the program played on the channel.

Figure 3:
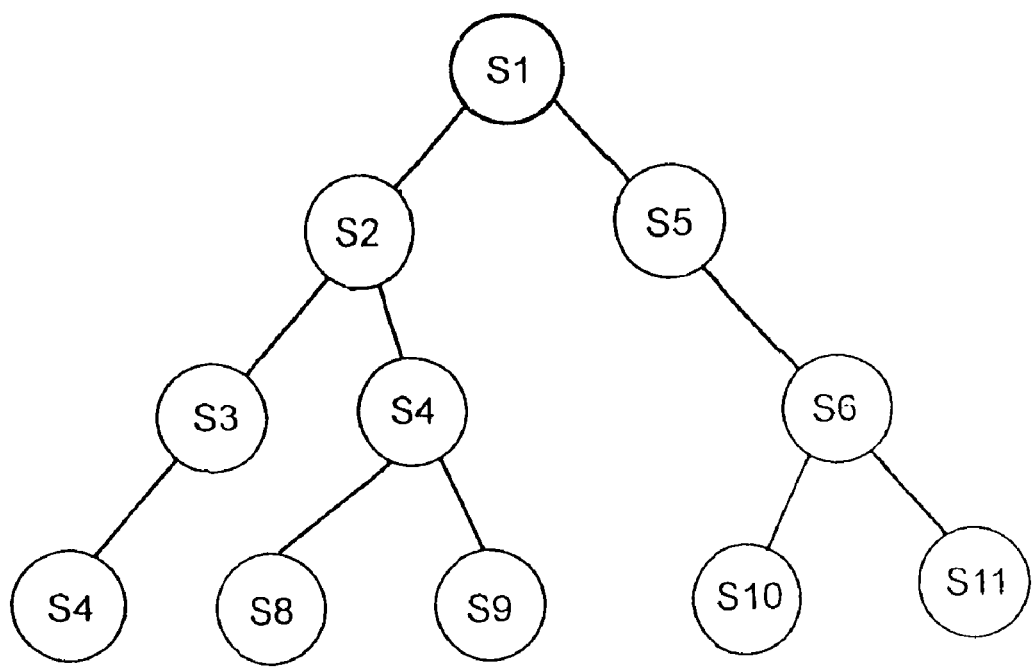
FIG. 3 is a schematic diagram of a channel merge tree.

In the present invention, the channel selecting unit 10 in the VOD server 1 creates a root channel (S1) and at least one sub-channel (S11) in response to the requests for a certain video program from a plurality of clients as shown in FIG. 3, said root channel (S1) being created according to the request of the client that makes the earliest request (such as client A), each of the a plurality of sub-channels (S11) (and also S5 and S6, for example) being created in response to the request of clients that make requests later, and the root channel S1 and the plurality of sub-channels S11 (and S5 and S6, etc.) form a tree structure. Certainly, all of the above-mentioned requests are those satisfying the VOD condition.

All the above-mentioned channels transfer multicast streams from the VOD server 1 based on the request of the client 4, and the multicast streams of each channel can be received by all the clients 4. Each client 4 receives at most two channels at the same time, of which one is initiated for the client 4 itself and another one was initiated for a previous client for example the first client requesting the object only receives a video program from a channel s1 (as shown in FIG. 3), while the second client receives the video program from channels s2 and s1 simultaneously, in which s1 is selected as the parent channel of s2 (as shown in FIG. 3). All clients must be capable of storing the received video program on a local storage (not shown). For each created channel, the VOD server 1 monitors the variation of the number of the clients 4 using the channel through the channel control unit 20 of the present invention. If the number of the clients 4 using the monitored channel is not zero, the channel is maintained; if the number of the clients 4 using the monitored channel is zero, i.e., no client 4 is using the channel, then the VOD server 1 closes the channel through the channel control unit 20 of present invention.

Here, the channel control unit 20 in the VOD server 1 detects the merging of two channels (video streams) either by its own calculation or by receiving messages from the client 4 where channel merging occurs. And the merging process continues until all sub-channels have merged into their root channel (the first channel created for the same video program). It is assumed that the length of the video program is infinite here.

The channel merging method according to the present invention will be described below with reference to the drawings.

Referring to FIG. 3 again, FIG. 3 is a schematic diagram of a channel merge tree. Each node represents a channel, where the first channel created for a certain video program is defined as a root channel. A higher level channel is defined as the parent channel of a lower level, and in contrast the lower level is defined as the sub-channel of the higher level channel. As shown in FIG. 3, S1 is the root channel, S6 is the parent channel of S11, while S11 is the sub-channel of S6, and channels S6, S10, S11 and S12 are a collection of the posterity channels of S5.

If the channel control unit 20 in the VOD server 1 creates a new channel, which we assume as channel S11, under the request of the client 4 (starting or jumping of a channel), then the channel selecting unit 10 immediately seeks the parent channel S6 for the channel S11. If the parent channel S6 is found, then the parent channel 6 is returned; otherwise, a message of "can not find the parent channel" is returned.

The method executing the above-mentioned operations is as follows:

Step 1: by using the following expression (1), find a nearest root channel such as S1 from the collection of active root channels to which the channel S11 will possibly merge, that is:

$$\min(S11.\text{start\_time} - S1.\text{start\_time}) < \text{object\_length}/2 \qquad (1)$$

wherein which, $\min(S11.\text{start\_time} - S1.\text{start\_time})$ indicates a minimal value among the difference values between the start time ($S11.\text{start\_time}$) of the channel S11 and the start time ($S1.\text{start\_time}$) of each root channel in the collection of the root channels, and object_length/2 indicates a half of total length (total time) of the played video program, and wherein the start time (start_time) indicates the start time of this channel. Therefore, the above expression means that the minimal value among the difference values between the start time of the channel S11 and the start time of a certain root channel S1 in the collection of the root channels is less than the ½ total length (total time) of the played video program. In this case, the root channel S1 is considered to be reachable by its sub-channel S11 and can act as the root channel S1 of the channel S11; otherwise, or if the difference value between the start times is larger than the ½ total length (total time) of the played video program, this root channel is considered to be unreachable, and therefore a message of "can not find the root channel" is returned, with the channel S11 being taken as a new root channel.

If an effective root channel S1 is found by using the above-mentioned condition, the method proceeds to the following step 2.

Step 2: if the collection of the posterity channels of the root channel S1 is defined as S, the posterity channels described here include the sub-channel S5 whose direct parent channel is root channel S1, and sub-channel S6 of the channel S5. Here the channel S11 is defined as the sub-channel of the channel S6, and meantime it can be known that the channel S11 is also a posterity channel of the channel S5, the rest being deduced by analogy. By using the following expression (2), the channel S6 is found in the collection S (wherein the channel S6 is the parent channel of the channel S11, and both channels S6 and S11 are within the posterity channel collection S and are posterity channels of the root channel S1):

$$\min(S11.\text{start\_time} - S6.\text{start\_time}) < S6.\text{start\_time} - S5.\text{start\_time} \qquad (2)$$

The above expression means that a parent channel S6 to which the channel S11 will merge is found for the channel S11, and this parent channel S6 should satisfy the following condition: the minimal value among the difference values between the start time of the channel S11 and the start time of the candidate parent channel S6 is less than the difference value between the start time of the parent channel S6 and the start time of the parent channel S5 of the parent channel S6.

If there exists a channel S6 satisfying the above-mentioned condition, then the channel S6 is returned as the parent channel of the channel S11 in the next merging. Otherwise, or if no channel satisfying the above condition can be found, the root channel S1 is returned as the parent channel of the channel S11.

Obviously, if only the above condition is satisfied, it is ensured that the parent channel S6 will not merge into the parent channel S5 of the parent channel S6 before the channel S11 merges into its parent channel S6.

That is to say, at the time a channel S6 merges into its parent channel S5, each sub-channel of the channel S6, such as S10 and S11, has merged into its parent channel S6. Therefore, from the time then knowing that the channel S6 merged into its parent channel S5 by calculation or by receiving the message from the client 4, the VOD server 1 closes the channel S6 so that the usage of other clients is not influenced. This is because if the selection of the channel S6 satisfies the above-mentioned condition, no other client is using the channel S6 at this time, i.e., channels S10 and S11 satisfying the above-mentioned condition have both merged into the channel S6. Thus, it is ensured that all the channel merging starts in a direction from the lowest sub-channel to their root level. That is, the channel will not be removed until all the clients 4 using a certain channel explicitly release the channel (in the form of the sub-channel of the channel).

The operations of the VOD server 1 and its units therein in response to such 4 types of events as starting, jumping, merging and stopping will be described below in conjunction with FIGS. 6, 7, 8 and 9.

First, the operations of the VOD server 1 and its units therein in response to a starting event will be described.

Figure 6:
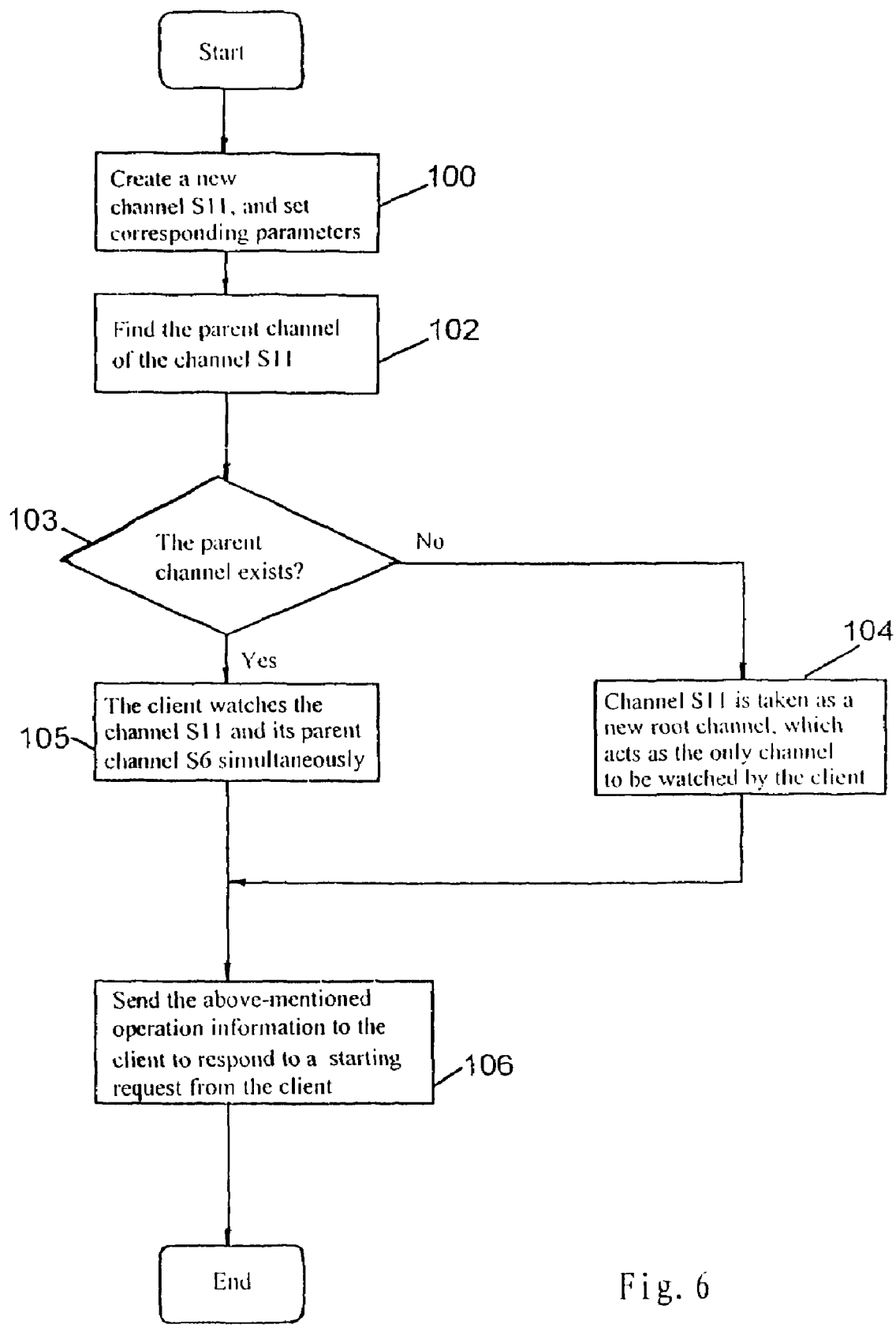
FIG. 6 is flow chart of the process of the VOD server in the case of occurrence of a "starting event" according to the present invention.

As shown in FIG. 6, when the client 4 initiates a starting event at time "t" (i.e., the client selects to play a video clip):

At step 100, the channel selecting unit 10 creates a new channel S11 to play back the video program, and sets in the channel S11 start_time=t, object_offset=0 (an object offset time indicating the offset time when the channel starts, i.e., the offset of the start time of the channel with respect to the channel starting at time "t") and ref_num=1 (reference value indicating the number of the clients), where start_time=t indicates the channel starts at time "t", object_offset=0 indicates the channel has no offset, and ref_num=1 indicates only one client is using the channel.

At step 102, the parent channel of the channel S11 is sought by the channel selecting unit 10.

At step 103, it is determined whether or not there exists the parent channel.

At step 104, if no parent channel is found, then the channel control unit 20 takes the channel S11 as a new root channel (i.e., sets root_flag=1 (a root mark indicating whether the channel is a root channel)), and this channel S11 is the only channel that the client 4 should watch.

Otherwise, at step 105, if the parent channel S6 is found, then the client 4 must watch the channel S11 and its parent channel S6 simultaneously.

At step 106, the above operation information is sent to the client 4 in response to the starting request initiated by the client 4.

Next, the operations of the VOD server 1 and its units therein in response to a jumping event will be described.

Figure 7:
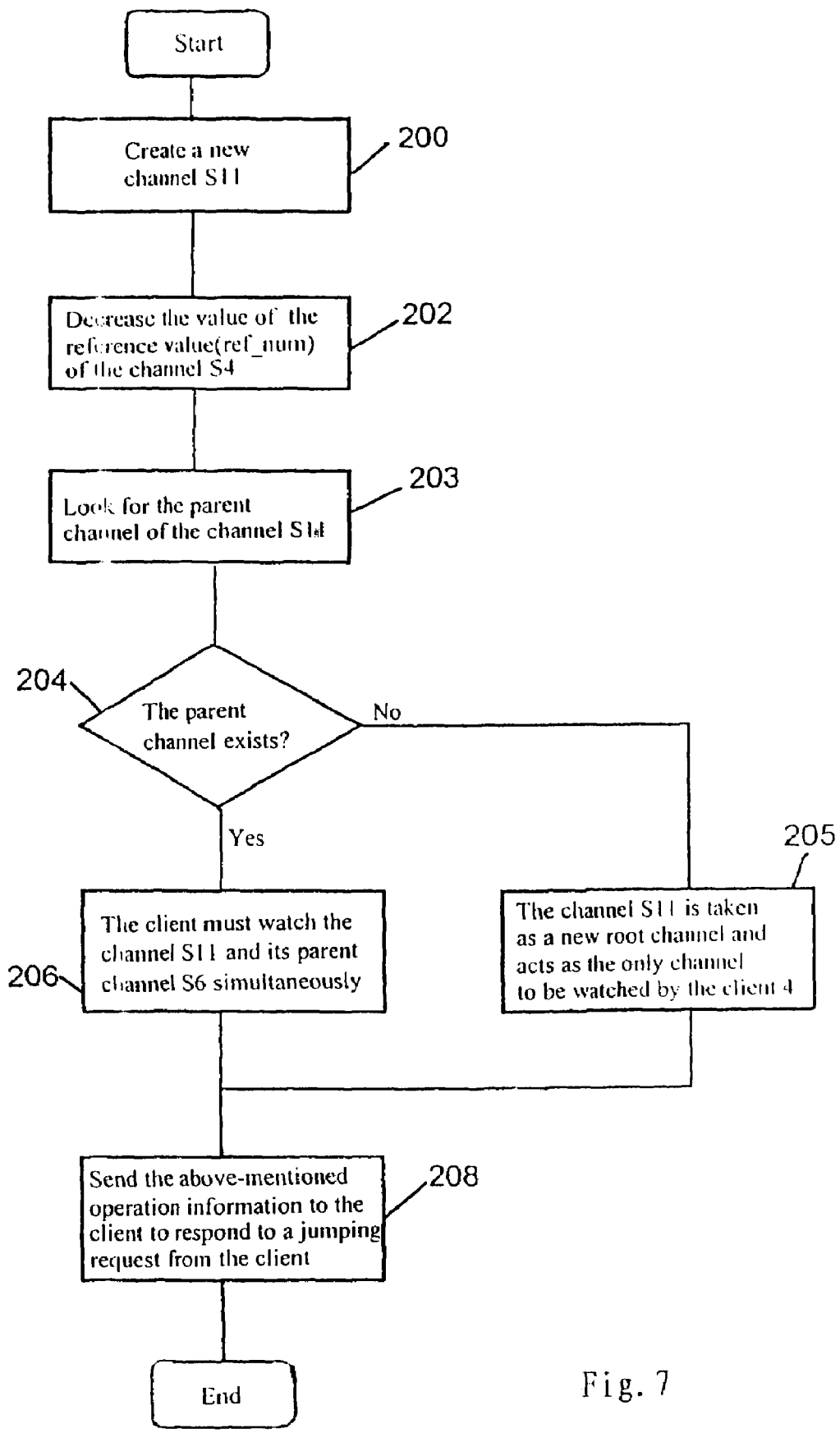
FIG. 7 is flow chart of the process of the VOD server in the case of occurrence of a "jumping event" according to the present invention.

As shown in FIG. 7, when the client 4 initiates a jumping event at the object offset time "s" with respect to time "t" (i.e., the client 4 performs VCR-like functions such as fast forward/backward at time "t−s"):

At step 200, the channel selecting unit 10 creates a new channel S11 to play back the video program starting from time "t−s", and sets in the channel S11 start_time=t−s, object_offset=s and ref_num=1, where start_time=t−s indicates the channel starts from time "t−s", object_offset=s indicates the offset time of the start time of the channel with respect to the channel starting from time "t" is "s", and ref_num=1 indicates only one client is using the channel.

At step 202, if the channel starting at time "t" is S4, then the value of the count parameter of the channel S4 is decreased, i.e., because the channel S4 previously used by the client 4 has been caused to perform a stopping operation, the number of the clients using the channel S4 is currently decreased by 1. At this time, if the count parameter of the channel S4 is zero, indicating that no client is using the channel S4 currently, then the channel control unit 20 closes the channel S4; and in contrast, if at this time the count parameter of the channel S4 is not zero, indicating that there are still some clients 4 using the channel S4, then the channel S4 can not be closed, so as to be used continuously by other clients using the channel S4 (such as S8 and S9). But the client 4 having invoked the jumping event no longer uses the channel S4. Instead, it turns to the channel S11 to watch the video program.

At step 203, the parent channel of the channel S11 is sought by the channel selecting unit 10.

At step 204, it is determined whether there exists the parent channel.

At step 205, if no parent channel is found, then the channel control unit 20 takes the channel S11 as a new root channel (i.e., sets root_flag=1), and this channel S11 is the only channel that the client 4 should watch.

Otherwise, at step 206, if the parent channel S6 is found, then the client 4 must watch the channel S11 and its parent channel S6 simultaneously.

At step 208, the above operation information is sent to the client 4 in response to the starting request initiated by the client 4.

Next, the operations of the VOD server 1 and its units therein in response to a merging event will be described.

Figure 8:
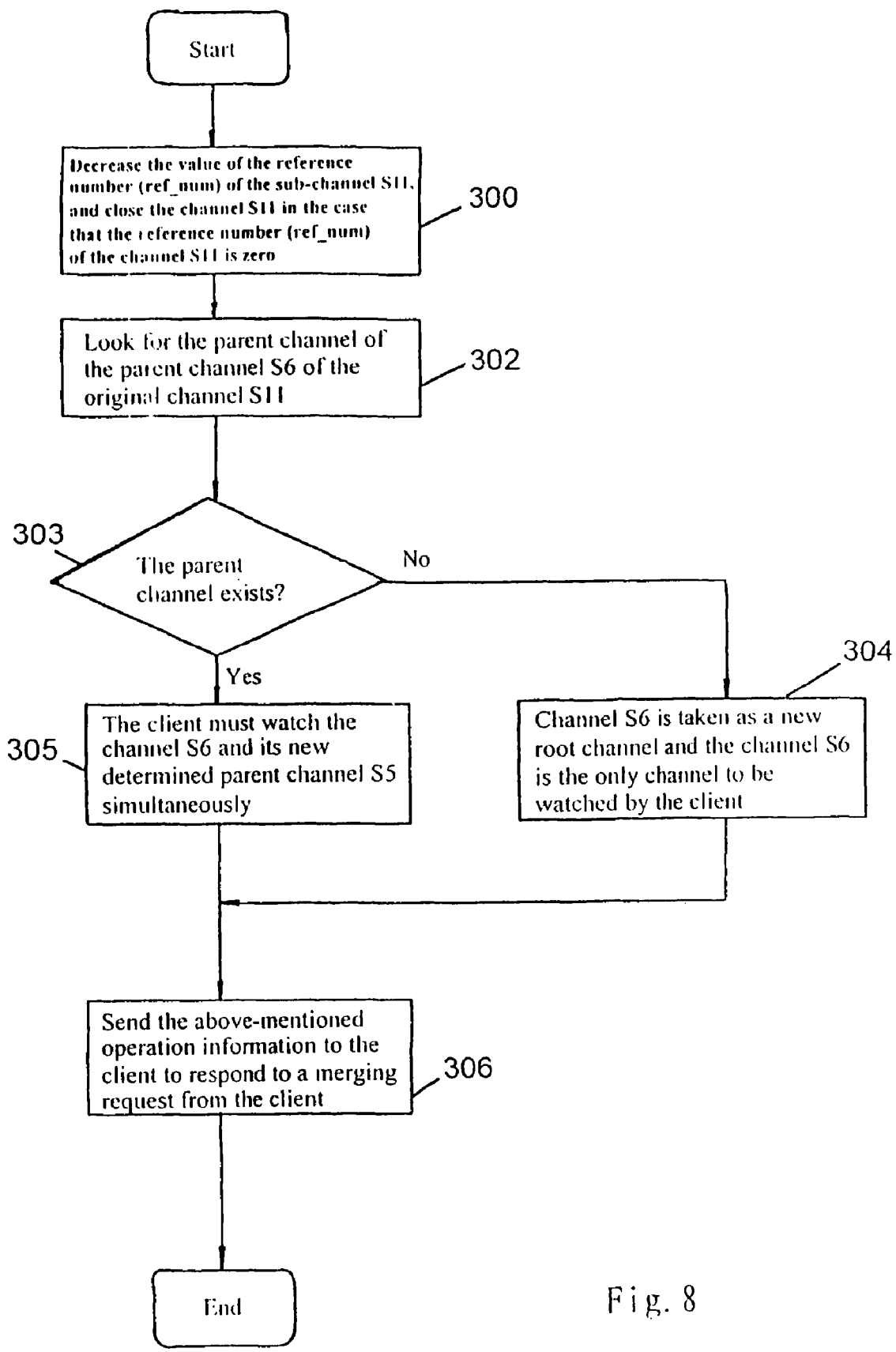
FIG. 8 is flow chart of the process of the VOD server in the case of occurrence of a "merging event" according to the present invention.

As shown in FIG. 8, when the client 4 initiates a merging event (i.e., the merging of the sub-channel S11 into the parent channel S6 occurs):

At step 300, the channel control unit 20 decreases the value of the count parameter of the sub-channel S11. That is, since the channel S11 used by the client 4 has merged into its parent channel S6, the number of the clients using the channel S11 is currently decreased by 1. At this time, if the count parameter of the channel S11 is zero, indicating that no client is using the channel S11 currently, then the VOD server 1 closes the channel S11; in contrast, if at this time the count parameter of the channel S11 is not zero, indicating that some clients are still using the channel S11, then the channel S11 can not be closed, so that other clients can use the channel S11 continuously. However, the client 4 initiating the merging event no longer uses the channel S11, and jumps to the channel S6 to watch the video program. The value of the count parameter of the channel S11 is the number of clients using the channel S11. For example, if the count parameter is 1 (i.e., ref_num=1), it is indicated that one client 4 is using the channel S11. If the count parameter is 5 (i.e., ref_num=5), it is indicated that five clients 4 are using the channel, all of these channels being the posterity channels of the channel S11.

At step 302, the parent channel of the channel S6 is sought by the channel selecting unit 10.

At step 303, it is determined whether or not there exists the parent channel.

At step 304, if no parent channel of the channel S6 is found, then the channel S6 is taken as a new root channel (i.e., sets root_flag=1), and this channel S6 is the only channel that the client 4 should watch.

Otherwise, at step 305, if the parent channel S5 of the channel S6 is found, the client 4 must watch the channel S6 and its newly determined parent channel S5 simultaneously.

At step 306, the above operation information is sent to the client 4 to respond to the merging request initiated by the client 4.

Next, the operations of the VOD server 1 and its units therein in response to a stopping event will be described.

Figure 9:
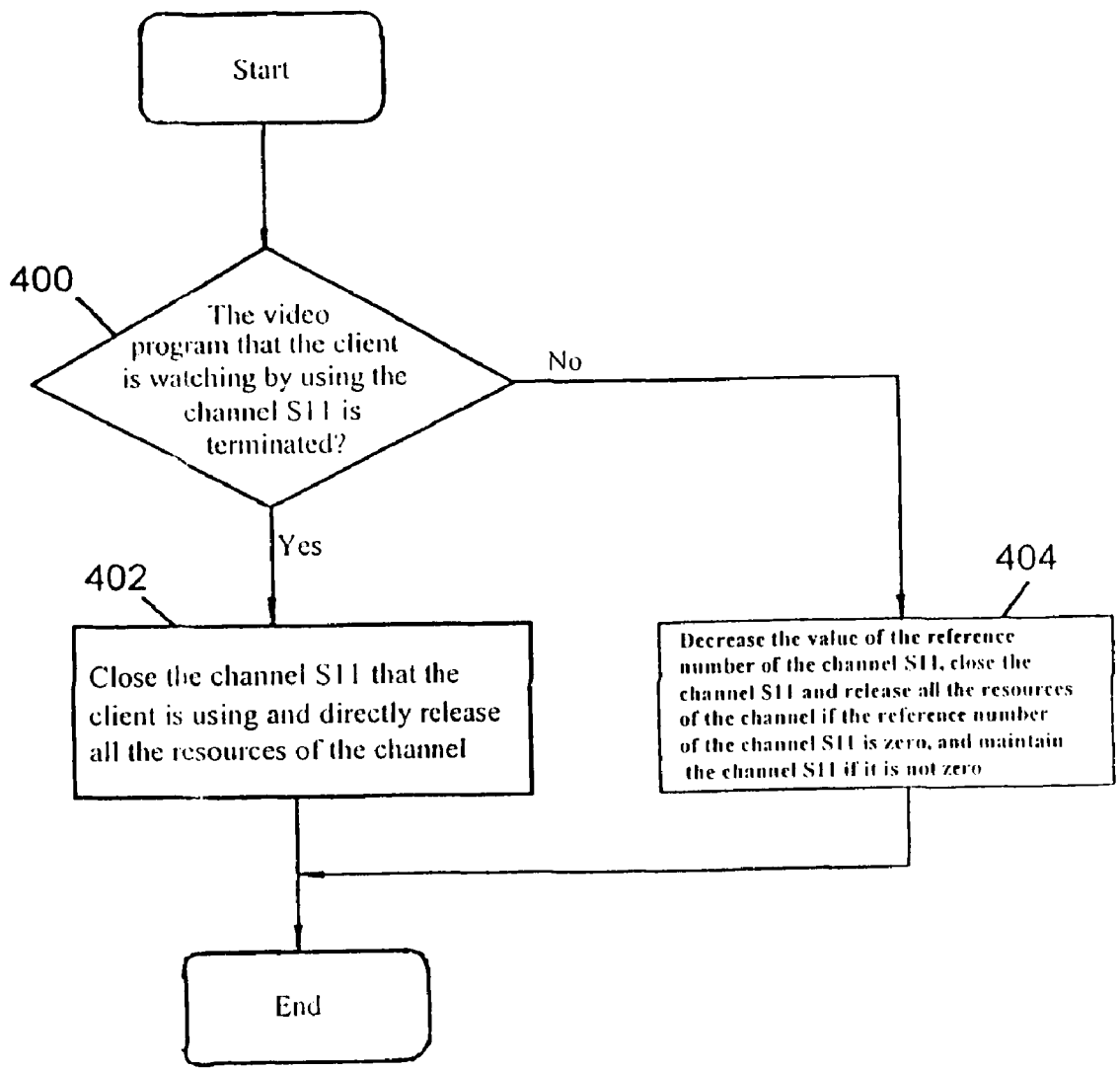
FIG. 9 is flow chart of the process of the VOD server in the case of occurrence of a "stopping event" according to the present invention.

As shown in FIG. 9, when the client 4 initiates a stopping event (i.e., the client 4 performs a stopping operation of VCR-like functions), or an object (video program) reaches an ending point (i.e., termination):

Assuming that a client is using the channel S11 to watch a video program, then at step 400, it is determined whether or not the video program reaches an ending point, i.e. whether the video program has terminated.

If the object (video program) reaches an ending point, then the channel control unit 20, at step 402, closes the channel S11 being used by the client 4, and directly releases all the resources of the channel.

If the video program does not reach the ending point, then at step 404, the channel control unit 20, as described above, decreases the value of the reference value of the channel S11. If the reference value of the channel S11 is zero, then the channel S11 is closed and all the resources of the channel are released; and in contrast, if the reference value of the channel S11 is not zero, then the channel control unit 20 does not close the channel S11, so that other clients can use the channel S11 continuously, and the client having invoked the "stopping event" no longer uses the channel S11.

The above-mentioned method for controlling the VOD server of the present invention is compatible with the request/response mode of HTTP, thus can be easily implemented upon HTTP. HTTP is an important protocol for exchanging application data on the Internet, and the advent of Web services further consolidates the trend that Internet-based applications should rely on HTTP as much as possible for data transmission. In addition, most firewalls are reluctant to let general traffic pass through, but there is not this problem for the HTTP.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The present invention has been described in detail in the above. It will be understood by those skilled in the art that various changes to the present invention according to the spirit and teaching concept of the present invention will all fall into the scope defined by the appended claims of the present invention.

What is claimed is:

1. A channel merging method for a VOD system, wherein said method comprising the steps of:
  (1) in response to requests from a plurality of clients for a video program, establishing a root channel (S1) and at least one sub-channel (S11), said root channel (S1) being established according to a request from a client that makes an earliest request, each of said sub-channels (S11) being established corresponding to a request of a client that makes a later request;
  (2) monitoring variation of number of the clients that are using each established channel, and maintaining the established channel if the number of the clients using a monitored channel is not zero, and closing the established channel if the number of the clients using the monitored channel becomes zero,
  wherein step (1) includes the sub-steps of:
    (1-1) searching a collection of root channels (S1) into which said sub-channels (S11) is possibly merged for a root channel (S1), said root channels (S1) satisfying the condition of $min(S11.start_{13}\ time - S1.start\_time) < object\_length/2$, wherein the $min(S11.start\_time -$ S1.start_time) indicates minimal values of the difference between the start time of said sub-channels (S11) and the start time of each root channel in said collection, and the object_length/2 indicates the half of the total length of the played video program;

(1-2) if said root channel (S1) exists, searching a collection of posterity channels of said root channel (S1) for a parent channel (S6) into which said sub-channel (S11) will be merged, said parent channel satisfying the condition of $\min(S11.\text{start\_time}-S6.\text{start}_{13}\text{ time})$ <S6.start_time−S5.start_time, wherein S6.start_time indicates the start time of said parent channel (S6), and S5.start_time indicates the start time of a parent channel (S5) of said parent channel (S6).

2. The channel merging method according to claim 1, wherein said root channel (S1) and each of said sub-channels are established in response to one of: a play starting request, and a program jumping request from a client.

3. The channel merging method according to claim 2, wherein if said client's request at time t is a starting request, a start time parameter is set to be t and an object offset parameter is set to be 0 in the sub-channel (S11).

4. The channel merging method according to claim 2, wherein if said client's request at time t is a jumping request, and the object offset time of said jumping is s, a start time parameter is set to be t and an object offset parameter is set to be s in the sub-channel (S11), and a stopping operation is performed on the channel on which said video program is played at time t and has been received by the client.

5. The channel merging method according to claim 1, wherein said root channel and said sub-channels form a tree structure.

6. The channel merging method according to claim 1, wherein said step (2) includes the sub-steps of:

(2-1) indicating the number of clients that are using each channel as a count parameter;

(2-2) decreasing the value of said count parameter in response to occurrence of the event of merging, jumping or stopping of said each channel and sub-channels thereof;

(2-3) closing said channel on the server side if the value of said count parameter becomes zero.

7. The channel merging method according to claim 6, wherein said channel is maintained on the server side if the value of said count parameter is not zero, and said clients having performed the event of merging, jumping or stopping no longer receive the programs being played on said channel.

8. The channel merging method according to claim 7, wherein if said stopping operation is due to the ending of said video program, said sub-channel is directly closed and all the resources of said sub-channel are released.

9. The channel merging method according to claim 1, wherein if said root channel (S1) is not found in step (1-1), said sub-channel (S11) is taken as a new root channel, its root channel parameter is set to be 1 and said sub-channel (S11) is the only channel being watched by said client.

10. The channel merging method according to claim 1, wherein if said parent channel is found in step (1-2), said client watches the video program both on said sub-channel (S11) and said parent channel.

11. The channel merging method according to claim 1, wherein if said parent channel is not found in step (1-2), the found root channel is taken as the parent channel of said sub-channel (S11), and said client watches the video program both on said sub-channel (S11) and said root channel.

12. The channel merging method according to claim 1, wherein when secondary sub-channels of said sub-channel (S11) are established, steps (1-1) and (1-2) are repeated to take said sub-channel (S11) as the parent channel of the secondary sub-channels, and the value of the count parameter of said sub-channel (S11) is increased by 1.

* * * * *